United States Patent
Guo et al.

(10) Patent No.: US 10,524,186 B2
(45) Date of Patent: Dec. 31, 2019

(54) REDIRECTION METHOD, DEVICE, AND SYSTEM

(71) Applicant: HUAWEI TECHNOLOGIES CO., LTD, Shenzhen, Guangdong (CN)

(72) Inventors: Haoping Guo, Beijing (CN); Li Shen, Beijing (CN); Xiaoguang Wu, Shenzhen (CN); Hui Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 34 days.

(21) Appl. No.: 15/575,317

(22) PCT Filed: May 20, 2015

(86) PCT No.: PCT/CN2015/079369
§ 371 (c)(1),
(2) Date: Nov. 17, 2017

(87) PCT Pub. No.: WO2016/183821
PCT Pub. Date: Nov. 24, 2016

(65) Prior Publication Data
US 2018/0152878 A1  May 31, 2018

(51) Int. Cl.
*H04W 40/12* (2009.01)
*H04L 12/26* (2006.01)
(Continued)

(52) U.S. Cl.
CPC ............ *H04W 40/12* (2013.01); *H04L 43/16* (2013.01); *H04W 24/08* (2013.01); *H04W 24/10* (2013.01);
(Continued)

(58) Field of Classification Search
CPC ..... H04W 40/12; H04W 36/24; H04W 24/10; H04W 24/08; H04W 36/0058; H04W 88/02; H04L 43/16
See application file for complete search history.

(56) References Cited

U.S. PATENT DOCUMENTS

2011/0194427 A1* 8/2011 Shirota ............. H04W 36/0022
370/252
2012/0295623 A1* 11/2012 Siomina ................ G01S 5/0263
455/436
(Continued)

FOREIGN PATENT DOCUMENTS

CN         101483927 A  *  7/2009  ............... H04L 1/00
CN         101483927 A      7/2009
(Continued)

OTHER PUBLICATIONS

Chinese Office Action issued in Chinese Application No. 201580020619.1 dated Nov. 27, 2018, 7 pages.
(Continued)

Primary Examiner — Shailendra Kumar
(74) Attorney, Agent, or Firm — Fish & Richardson P.C.

(57) ABSTRACT

A redirection method includes: detecting, by user equipment, that signal quality of a currently accessed cell is less than a specified threshold; determining, whether the user equipment satisfies a specified condition; if it is determined that the user equipment satisfies the specified condition, sending a measurement report to a network side, so that the network side sends a redirection command to the user equipment according to the measurement report; or if it is determined that the user equipment does not satisfy the specified condition, skipping sending of a measurement report to a network side.

16 Claims, 5 Drawing Sheets

(51) Int. Cl.
*H04W 24/08* (2009.01)
*H04W 24/10* (2009.01)
*H04W 36/24* (2009.01)
*H04W 88/02* (2009.01)
*H04W 36/00* (2009.01)

(52) U.S. Cl.
CPC ........ *H04W 36/24* (2013.01); *H04W 36/0058* (2018.08); *H04W 88/02* (2013.01)

(56) References Cited

U.S. PATENT DOCUMENTS

| | | |
|---|---|---|
| 2013/0189989 A1 | 7/2013 | Hu |
| 2014/0242982 A1 | 8/2014 | Yang et al. |
| 2015/0004978 A1 | 1/2015 | Shirota et al. |
| 2015/0038141 A1* | 2/2015 | Cheng ............... H04W 36/0088 455/436 |
| 2015/0117399 A1* | 4/2015 | Yang .................... H04W 36/30 370/331 |
| 2015/0117410 A1* | 4/2015 | Wu ........................ H04L 1/08 370/331 |
| 2018/0146403 A1 | 5/2018 | Chai et al. |

FOREIGN PATENT DOCUMENTS

| | | | |
|---|---|---|---|
| CN | 101505514 A | * | 8/2009 |
| CN | 101505514 A | | 8/2009 |
| CN | 102474772 A | | 5/2012 |
| CN | 102511183 A | | 6/2012 |
| CN | 103188724 A | | 7/2013 |
| CN | 103327554 A | | 9/2013 |
| CN | 103391574 A | | 11/2013 |
| CN | 104349383 A | | 2/2015 |
| EP | 2725848 A2 | | 4/2014 |

OTHER PUBLICATIONS

International Search Report in International Application No. PCT/CN2015/079369, dated Feb. 18, 2016, 6 pages.

Office Action issued in Chinese Application No. 201580020619.1 dated Jun. 4, 2019, 7 pages.

* cited by examiner

REDIRECTION METHOD, DEVICE, AND SYSTEM

CROSS REFERENCE TO RELATED APPLICATIONS

This application is a national stage of International Application No. PCT/CN2015/079369, filed on May 20, 2015, which is hereby incorporated by reference in its entirety.

TECHNICAL FIELD

Embodiments of the present invention relate to communications technologies, and in particular, to a redirection method, device, and system.

BACKGROUND

Long Term Evolution (LTE) is the long term evolution of Universal Mobile Telecommunications System (UMTS) technical standards formulated by the 3rd Generation Partnership Project (The 3rd Generation Partnership Project, 3GPP for short) organization. As a new-generation mobile telecommunications technology, LTE can provide a higher user rate, a shorter delay, and more abundant services, and greatly improve user experience. However, construction of LTE networks is a long-term process, and during the process, there may be areas with poor LTE signal coverage. When user equipment is in an area with poor LTE signal coverage, the user equipment sends, to a network side, a signal quality measurement report of a currently accessed cell of the user equipment. To prevent a service interruption problem and improve service experience of a user, the network sends a redirection command to request the user equipment (UE) to redirect to a 3G network.

For reasons such as design limitations and service conflict of user equipment, during redirection of the user equipment, a case in which the user equipment fails to be connected to a 3G network occurs, resulting in that the user equipment fails to be redirected to the 3G network. For example, currently, most Code Division Multiple Access (CDMA) terminals support simultaneous voice and LTE (SVLTE), but does not support simultaneous voice and EV-DO (SVDO). Therefore, during a call of the user equipment, a CDMA module of the user equipment occupies a radio frequency resource in this case, and a 3G module of the user equipment cannot obtain the radio frequency resource, resulting in that the user equipment cannot be connected to the 3G network. Therefore, in the prior art, user equipment receives a redirection command sent by a network side, and a redirection operation is performed according to the redirection command. However, the user equipment cannot be connected to the 3G network due to a reason, resulting in that for a long time, the user equipment is in a state in which no 3G or LTE network is available, and consequently, a normal service of a user is severely affected.

SUMMARY

The present invention provides a redirection method, device, and system, to effectively prevent a user from staying, for a long time, in a state in which no network is available, and ensure a normal service of the user.

According to a first aspect, a redirection method is provided, including:

determining, by user equipment, that signal quality of a currently accessed cell is less than a specified threshold; if it is determined that the user equipment satisfies the specified condition, permitting sending of a measurement report to a network side, so that the network side sends a redirection command to the user equipment according to the measurement report; receiving the redirection command, where the redirection command carries information about a cell to which redirection is to be performed; and initiating, within a specified time according to the redirection command, redirection to the cell to which redirection is to be performed.

Further, in a possible implementation manner, the method further includes: if it is determined that the user equipment does not satisfy the specified condition, prohibiting sending of the measurement report to the network side.

Further, in a possible implementation manner, the specified condition is set according to at least one of a network standard or a service status supported by the user equipment.

Further, in a possible implementation manner, the specified time is carried in the redirection command.

According to a second aspect, a redirection method is provided, including:

receiving, by user equipment, a redirection command sent by a network side, where the redirection command carries information about a cell to which redirection is to be performed; and if it is determined that the user equipment does not satisfy a specified condition, initiating, within an adjustable first specified time according to the redirection command, redirection to the cell to which redirection is to be performed.

Further, in a possible implementation manner, the specified condition is set according to at least one of a network standard or a service status supported by the user equipment.

Further, in a possible implementation manner, the first specified time is determined according to at least one of coverage of a currently accessed cell of the user equipment or a moving speed of the user equipment.

Further, in a possible implementation manner, that the first specified time is determined according to at least one of coverage of a currently accessed cell of the user equipment or a moving speed of the user equipment is specifically: determining the first specified time according to a function $$f(c) = \begin{cases} T_1 + \Delta_1 & (0 < c \leq A) \\ T_1 + \Delta_2 & (A < c \leq B) , \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

Further, in a possible implementation manner, the initiating, within an adjustable first specified time according to the redirection command, redirection to the cell to which redirection is to be performed further includes: if the user equipment satisfies the specified condition, ending the first specified time, so that the user equipment searches for an accessible cell.

Further, in a possible implementation manner, the redirection method further includes: if it is determined that the user equipment satisfies the specified condition, initiating, within a fixed second specified time according to the redirection command, redirection to the cell to which redirection is to be performed.

Further, in a possible implementation manner, the second specified time is carried in the redirection command.

According to a third aspect, a redirection method is provided, including:

determining, by user equipment, that signal quality of a currently accessed cell is less than a specified threshold; determining whether the user equipment satisfies a specified condition; if it is found, based on the determining, that the user equipment satisfies the specified condition, permitting sending of a measurement report to a network side, so that the network side sends a redirection command to the user equipment according to the measurement report; receiving the redirection command, where the redirection command carries information about a cell to which redirection is to be performed; determining a second time whether the user equipment satisfies the specified condition; and if it is found, based on the second time of determining, that the user equipment does not satisfy the specified condition, initiating, within an adjustable first specified time according to the redirection command, redirection to the cell to which redirection is to be performed.

Further, in a possible implementation manner, the method further includes: if it is found, based on the determining, that the user equipment does not satisfy the specified condition, prohibiting sending of the measurement report to the network side.

Further, in a possible implementation manner, the specified condition is set according to at least one of a network standard or a service status supported by the user equipment.

Further, in a possible implementation manner, the first specified time is determined according to at least one of coverage of a currently accessed cell of the user equipment or a moving speed of the user equipment.

Further, in a possible implementation manner, that the first specified time is determined according to at least one of coverage of a currently accessed cell of the user equipment or a moving speed of the user equipment is specifically: determining the first specified time according to a function $$f(c) = \begin{cases} T_1 + \Delta_1 & (0 < c \leq A) \\ T_1 + \Delta_2 & (A < c \leq B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

Further, in a possible implementation manner, the initiating, within an adjustable first specified time according to the redirection command, redirection to the cell to which redirection is to be performed further includes: if the user equipment satisfies the specified condition before the first specified time is reached, ending the first specified time, so that the user equipment searches for an accessible cell.

Further, in a possible implementation manner, the method further includes: if it is found, based on the second time of determining, that the user equipment satisfies the specified condition, initiating, within a fixed second specified time according to the redirection command, redirection to the cell to which redirection is to be performed.

Further, in a possible implementation manner, the second specified time is carried in the redirection command.

According to a fourth aspect, a redirection apparatus applied to user equipment is provided, including:

a determining module, configured to determine that signal quality of a currently accessed cell is less than a specified threshold;

a processing module, configured to: if it is determined that the user equipment satisfies the specified condition, permit sending of a measurement report to a network side, so that the network side sends a redirection command to the user equipment according to the measurement report;

a receiving module, configured to receive the redirection command, where the redirection command carries information about a cell to which redirection is to be performed; and an initiation module, configured to initiate, within a specified time according to the redirection command, redirection to the cell to which redirection is to be performed.

Further, in a possible implementation manner, the processing module is further configured to: if it is determined that the user equipment does not satisfy the specified condition, prohibit sending of the measurement report to the network side.

Further, in a possible implementation manner, the specified condition is set according to at least one of a network standard or a service status supported by the user equipment.

Further, in a possible implementation manner, the specified time is carried in the redirection command.

According to a fifth aspect, a redirection apparatus applied to user equipment is provided, including:

a receiving module, configured to receive a redirection command sent by a network side, where the redirection command carries information about a cell to which redirection is to be performed; and a processing module, configured to: if it is determined that the user equipment does not satisfy a specified condition, initiate, within an adjustable first specified time according to the redirection command, redirection to the cell to which redirection is to be performed.

Further, in a possible implementation manner, the specified condition is set according to at least one of a network standard or a service status supported by the user equipment.

Further, in a possible implementation manner, the first specified time is determined according to at least one of coverage of a currently accessed cell of the user equipment or a moving speed of the user equipment.

Further, in a possible implementation manner, the first specified time is specifically determined according to a function $$f(c) = \begin{cases} T_1 + \Delta_1 & (0 < c \leq A) \\ T_1 + \Delta_2 & (A < c \leq B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

Further, in a possible implementation manner, if the user equipment satisfies the specified condition before the first specified time is reached, the processing module is further configured to end the first specified time, so that the user equipment searches for an accessible cell.

Further, in a possible implementation manner, the processing module is further configured to: if it is determined that the user equipment satisfies the specified condition, initiate, within a fixed second specified time according to the redirection command, redirection to the cell to which redirection is to be performed.

Further, in a possible implementation manner, the second specified time is carried in the redirection command.

According to a sixth aspect, a redirection apparatus applied to user equipment is provided, including:

a determining module, configured to determine that signal quality of a currently accessed cell of the user equipment is less than a specified threshold;

a first determining module, configured to determine whether the user equipment satisfies a specified condition;

a processing module, configured to: if the first determining module determines that the user equipment satisfies the specified condition, permit sending of a measurement report to a network side, so that the network side sends a redirection command to the user equipment according to the measurement report;

a receiving module, configured to receive the redirection command, where the redirection command carries information about a cell to which redirection is to be performed;

a second determining module, configured to: after the redirection command is received, determine a second time whether the user equipment satisfies the specified condition; and an initiation module, configured to: if the second determining module determines that the user equipment does not satisfy the specified condition, initiate, within an adjustable first specified time according to the redirection command, redirection to the cell to which redirection is to be performed.

Further, in a possible implementation manner, the processing module is further configured to: if the first determining module determines that the user equipment does not satisfy the specified condition, prohibit sending of the measurement report to the network side.

Further, in a possible implementation manner, the specified condition is set according to at least one of a network standard or a service status supported by the user equipment.

Further, in a possible implementation manner, the first specified time is determined according to at least one of coverage of a currently accessed cell of the user equipment or a moving speed of the user equipment.

Further, in a possible implementation manner, the first specified time is specifically determined according to a function $$f(c) = \begin{cases} T_1 + \Delta_1 & (0 < c \le A) \\ T_1 + \Delta_2 & (A < c \le B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

Further, in a possible implementation manner, if the user equipment satisfies the specified condition before the first specified time is reached, the initiation module is further configured to end the first specified time, so that the user equipment searches for an accessible cell.

Further, in a possible implementation manner, the initiation module is further configured to: if the second determining module determines that the user equipment satisfies the specified condition, initiate, within a fixed second specified time according to the redirection command, redirection to the cell to which redirection is to be performed.

Further, in a possible implementation manner, the second specified time is carried in the redirection command.

According to a seventh aspect, user equipment is provided, including:

a transceiver, a memory, and a processor that is coupled to the memory, where the processor is configured to: determine that signal quality of a currently accessed cell is less than a specified threshold; if it is determined that the user equipment satisfies the specified condition, permit sending of a measurement report to a network side, so that the network side sends a redirection command to the user equipment according to the measurement report; and after the transceiver receives the redirection command, initiate, within a specified time according to the redirection command, redirection to a cell to which redirection is to be performed, where the redirection command carries information about the cell to which redirection is to be performed.

Further, in a possible implementation manner, the processor is further configured to: if it is determined that the user equipment does not satisfy the specified condition, prohibit sending of the measurement report to the network side.

Further, in a possible implementation manner, the specified condition is set according to at least one of a network standard or a service status supported by the user equipment.

Further, in a possible implementation manner, the specified time is carried in the redirection command.

According to an eighth aspect, user equipment is provided, including:

a transceiver, a memory, and a processor that is coupled to the memory, where the processor is configured to: after the transceiver receives a redirection command sent by a network side, if it is determined that the user equipment does not satisfy a specified condition, initiate, within an adjustable first specified time according to the redirection command, redirection to a cell to which redirection is to be performed, where the redirection command carries information about the cell to which redirection is to be performed.

Further, in a possible implementation manner, the specified condition is set according to at least one of a network standard or a service status supported by the user equipment.

Further, in a possible implementation manner, the first specified time is determined according to at least one of coverage of a currently accessed cell of the user equipment or a moving speed of the user equipment.

Further, in a possible implementation manner, the first specified time is specifically determined according to a function $$f(c) = \begin{cases} T_1 + \Delta_1 & (0 < c \le A) \\ T_1 + \Delta_2 & (A < c \le B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

Further, in a possible implementation manner, if the user equipment satisfies the specified condition before the first specified time is reached, the processor is further configured to end the first specified time, so that the user equipment searches for an accessible cell.

Further, in a possible implementation manner, the processor is further configured to: after the transceiver receives the redirection command sent by the network side, if it is determined that the user equipment satisfies the specified condition, initiate, within a fixed second specified time according to the redirection command, redirection to the cell to which redirection is to be performed.

Further, in a possible implementation manner, the second specified time is carried in the redirection command.

According to a ninth aspect, user equipment is provided, including:

a transceiver, a memory, and a processor that is coupled to the memory, where the processor is configured to: determine that signal quality of a currently accessed cell is less than a specified threshold; determine whether the user equipment satisfies a specified condition; if it is found, based on the determining, that the user equipment satisfies the specified condition, permit sending of a measurement report to a network side, so that the network side sends a redirection command to the user equipment according to the measurement report; after the transceiver receives the redirection command, determine a second time whether the user equipment satisfies the specified condition; and if it is found, based on the second time of determining, that the user equipment does not satisfy the specified condition, initiate, within an adjustable first specified time according to the redirection command, redirection to a cell to which redirection is to be performed.

Further, in a possible implementation manner, the processor is further configured to: if it is found, based on the determining, that the user equipment does not satisfy the specified condition, prohibit sending of the measurement report to the network side.

Further, in a possible implementation manner, the specified condition may be set according to at least one of a network standard or a service status supported by the user equipment.

Further, in a possible implementation manner, the first specified time is determined according to at least one of coverage of a currently accessed cell of the user equipment or a moving speed of the user equipment.

Further, in a specific implementation manner, the first specified time is specifically determined according to a function $$f(c) = \begin{cases} T_1 + \Delta_1 & (0 < c \le A) \\ T_1 + \Delta_2 & (A < c \le B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

Further, in a possible implementation manner, if the user equipment satisfies the specified condition before the first specified time is reached, the processor is further configured to end the first specified time, so that the user equipment searches for an accessible cell.

Further, in a possible implementation manner, the processor is further configured to: if it is found, based on the second time of determining, that the user equipment satisfies the specified condition, initiate, within a fixed second specified time according to the redirection command, redirection to the cell to which redirection is to be performed.

Further, in a possible implementation manner, the second specified time is carried in the redirection command.

According to a tenth aspect, a redirection system is provided, including an eNB and the user equipment that has the apparatus according to any one of the fourth, the fifth, or the sixth aspect.

According to an eleventh aspect, a redirection system is provided, including an eNB and the user equipment that has the apparatus according to any one of the seventh, the eighth, or the ninth aspect.

The embodiments of the present invention provide the redirection method, device, and system. When user equipment needs to be redirected, the user equipment first determines whether a current state of the user equipment is suitable for redirection, and if the current state of the user equipment is suitable for redirection, sends a related measurement report to a network side, and the network side delivers a redirection command to the user equipment according to the related measurement report. A success rate of redirection is relatively high if redirection is performed in this case, and the user equipment can rapidly access a cell to which the user equipment is to be redirected as required by the network side. Therefore, a success rate of redirection can be improved, a user is effectively prevented from staying, for a long time, in a state in which no network is available because redirection fails, and a normal service of the user is ensured.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiments of the present invention may be applied to CDMA, UMTS, LTE, and future-evolved network interoperations. Redirection refers to disconnection of UE from a current network and access of the UE to a network of another standard. Generally, redirection includes two processes: 1) The UE leaves a current network: The UE is disconnected from a current network and enters an idle mode, and a network side instructs, by using a redirection command, the UE to try to camp on a specified system/frequency after the UE leaves a connected state. The redirection command carries frequency information about a target redirection network, so as to help the UE rapidly access a new network. 2) The UE accesses the new network: The UE performs access and initiates a service according to the frequency information that is provided by the network side and that is about the target redirection network. To describe an implementation solution of the present invention more clearly, a detailed description is provided below by using an example of redirection from an LTE network to a 3G network.

Figure 1:
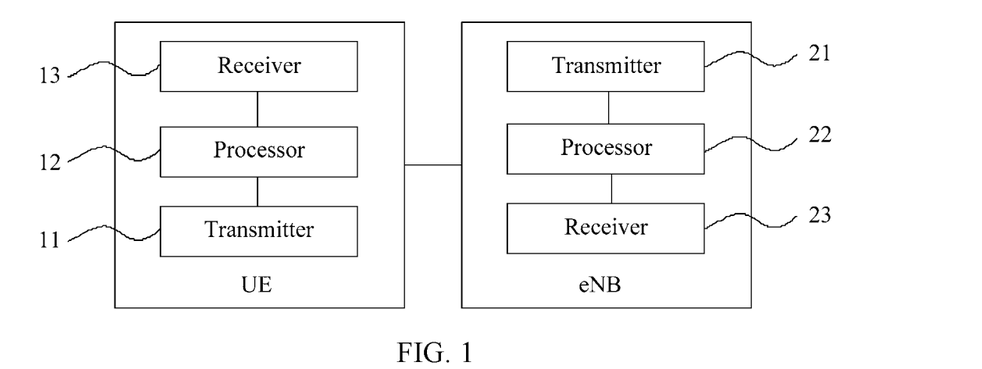
FIG. 1 is a schematic diagram of a system for simulating redirection.

FIG. 1 is a schematic diagram of a system for simulating redirection. As shown in FIG. 1, the system includes an evolved Node B (eNB) and UE. When the UE detects, by using a processor 12, that signal strength of a currently accessed cell decreases and becomes less than a redirection reporting threshold required by the eNB, the UE reports an event of a measurement report to the eNB by using a transmitter 11. After the eNB receives, by using a receiver 23, the event of the measurement report sent by the UE, a processor 22 of the eNB generates, according to the measurement report, a redirection command that carries frequency information about a target redirection network, and sends the redirection command to the UE by using a transmitter 21, and requests the UE to redirect to a specified network. After the UE receives the redirection command by using a receiver 13, the processor 12 starts a redirection timer, so that the UE initiates redirection to the specified network within a specified time.

Figure 2:
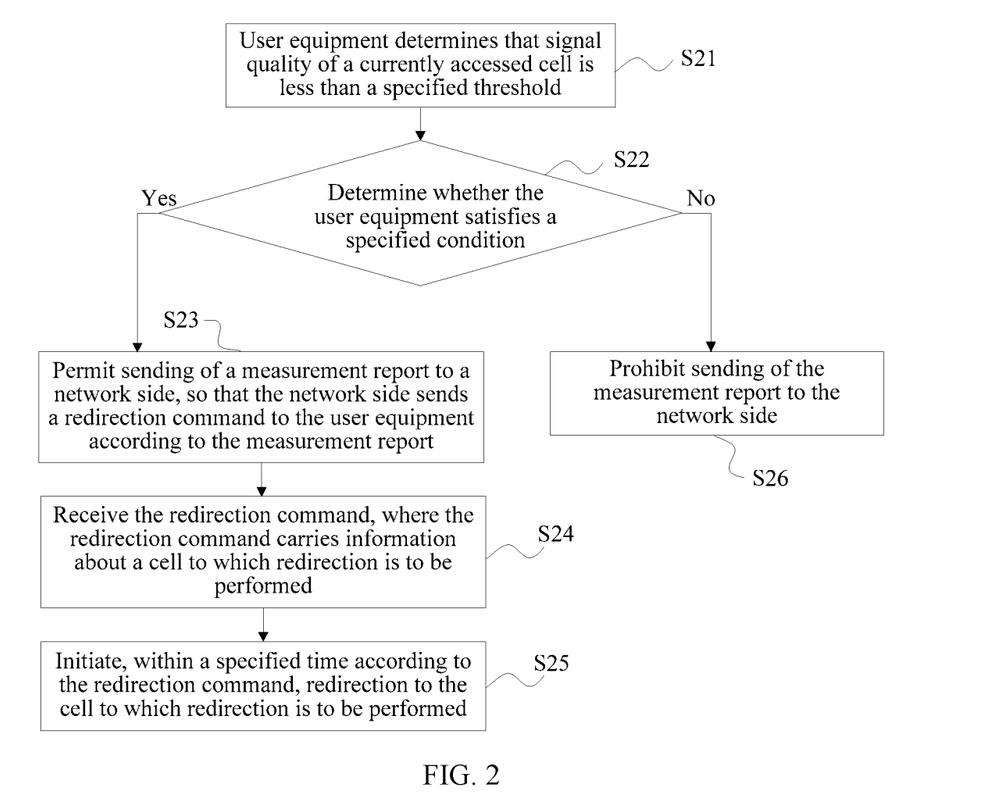
FIG. 2 is a flowchart of a redirection method according to an embodiment of the present invention.

FIG. 2 is a flowchart of a redirection method according to an embodiment of the present invention. As shown in FIG. 2, the redirection method provided in this embodiment includes the following steps:

S21: User equipment determines that signal quality of a currently accessed cell is less than a specified threshold.

S22: Determine whether the user equipment satisfies a specified condition.

S23: If it is determined that the user equipment satisfies the specified condition, permit sending of a measurement report to a network side, so that the network side sends a redirection command to the user equipment according to the measurement report.

S24: Receive the redirection command, where the redirection command carries information about a cell to which redirection is to be performed.

S25: Initiate, within a specified time according to the redirection command, redirection to the cell to which redirection is to be performed.

Specifically, in this embodiment, a determining condition may be set according to a network standard and a service status supported by the UE.

For example, if the UE is a CDMA terminal, because currently, most CDMA terminals support an SVLTE mode but does not support an SVDO mode, during a call of the user equipment, a CDMA module of the user equipment occupies a radio frequency resource in this case, and a 3G module of the user equipment cannot obtain the radio frequency resource, resulting in that the user equipment cannot be connected to a 3G network. Therefore, whether the UE is in a calling state is determined. If the UE is not in a calling state, a current state of the UE is suitable for redirection, that is, it may be determined that the UE satisfies a specified condition of reporting a measurement report. If the UE is in a calling state, whether the UE supports the SVDO mode may further be determined. If the UE supports the SVDO mode, the current state of the UE is still suitable for redirection. If the UE does not support the SVDO mode, the current state of the UE is not suitable for redirection, that is, it may be determined that the UE does not satisfy the specified condition of reporting a measurement report. It should be noted that the foregoing example is merely used to describe a setting basis for the specified condition of the UE in a redirection process in this embodiment, but is not limitative. For a CDMA terminal, there may further be another specified condition. For example, the terminal does not support a search for EVDO, or an EVDO frequency is avoided because an access attempt fails, and is not cleared yet.

It may be understood that if the UE is a terminal that supports other network standards such as Wideband Code Division Multiple Access (Wideband Code Division Multiple Access, WCDMA for short) or Time Division-Synchronous Code Division Multiple Access (Time Division-Synchronous Code Division Multiple Access, TD-SCDMA for short), whether the current state of the UE is suitable for redirection may still be determined according to conditions such as a design limit and a service status of the user equipment. For example, for UE of a WCDMA standard, if WCDMA cannot be connected because a card inserted in the UE does not support a WCDAM network or authentication of a WCDMA network fails, in this case, redirection to WCDMA should be avoided.

In this embodiment, after the UE receives the redirection command sent by the network side, a timer may be started to perform redirection, and the timer is configured to set the specified time to perform redirection.

In an optional implementation manner, the specified time of the timer may be set according to related technologies or design characteristics of the UE. It may be understood that for same user equipment, the specified time of the timer is fixed.

In another optional implementation manner, the redirection command delivered by the network side may be used to instruct the UE to set the specified time of the timer. In other words, the redirection command may further carry a time value of redirection. After receiving the redirection command, the UE may directly set the specified time of the timer according to an instruction of the redirection command, and initiate redirection to the cell to which redirection is to be performed within the specified time.

In addition, it should be noted that in an actual application, a time interval $\Delta T$ of detecting, by the UE, signal quality of an accessed cell may be adaptively adjusted according to factors such as coverage of an accessed cell of the UE and a moving speed of the UE. If the coverage of the accessed cell of the UE is relatively large or the moving speed of the UE is relatively slow, $\Delta T$ may be correspondingly adjusted to be relatively long. If the coverage of the accessed cell of the UE is relatively small or the moving speed of the UE is relatively fast, $\Delta T$ may be adjusted correspondingly to be relatively short.

Further, if $\Delta T$ is relatively large and at a moment T, the UE detects that signal quality of an accessed cell is less than the specified threshold and determines that the UE does not satisfy the specified condition, the UE does not send the measurement report to the network side. However, after a time $\Delta T_1$ ($\Delta T_1 < \Delta T$), a state of the UE not satisfying the specified condition is released, and in an optional implementation manner, the UE may determine a time interval $\Delta t$ ($\Delta t = \Delta T - \Delta T_1$) between a moment $T + \Delta T_1$ and a moment $T + \Delta T$. If $\Delta t$ is greater than a specified time (for example, $\Delta t > \Delta T/2$), the UE may continue to send a measurement report to the network side at the moment T, so that the network side sends the redirection command to the user equipment according to the measurement report. In another optional implementation manner, the UE may further detect the signal quality of the accessed cell at the moment $T + \Delta T_1$. If the signal quality at the moment $T + \Delta T_1$ is less than the specified threshold, the measurement report is sent to the network side at the moment $T + \Delta T_1$, so that the network side sends the redirection command to the user equipment according to the measurement report.

It may be known according to a basic process of redirection that the network side is triggered to send the redirection command to the UE by a measurement report that is reported by the UE and that indicates that signal strength of the currently accessed cell is less than a redirection reporting threshold required by the eNB. In this embodiment, whether the measurement report is to be reported to the eNB is determined by using a decision-making machine. When the UE detects that the signal quality of the currently accessed cell is less than the specified threshold, the UE first determines whether the current state of the UE is suitable for redirection, that is, whether the UE satisfies the specified condition. If the current state of the UE is suitable for redirection (the specified condition is satisfied), the UE sends a redirection request to the network side, so that in this case, a success rate of redirection is relatively high if redirection is performed in this case, and the UE can rapidly access a cell to which the UE is to be redirected as required by the network side. As compared with direct triggering of the network side to send the redirection command to the UE to enable the UE to connect to a specified network, if the current state of the UE is not suitable for redirection, a probability that redirection succeeds is relatively low. If registration with the specified network cannot be completed within a time set by a redirection timer, it may result in that the UE stays, for a long time, in a state in which no network is available. By means of the redirection method provided in this embodiment, a success rate of redirection can be improved, UE can rapidly access a system/frequency specified by a network side, a user is effectively prevented from staying, for a long time, in a state in which no network is available, and a normal service of a user is ensured.

In an optional implementation manner of this embodiment, if it is determined that the user equipment does not satisfy the specified condition, S26 of prohibiting sending of the measurement report to the network side may be performed.

It may be understood that if the current state of the UE is not suitable for redirection, that is, a specified condition is not satisfied, a probability that redirection succeeds is relatively low. If registration with a specified network cannot be completed within a time set by a redirection timer, it may result in that the user equipment stays, for a long time, in a state in which no network is available. If the current state of the UE is not suitable for redirection (the specified condition is not satisfied), the UE does not send a redirection request to a network side temporarily, and the network side is not triggered to send a redirection command to the UE, so that the UE may continue residing in a currently accessed cell, and a normal service of a user is ensured.

Figure 3:
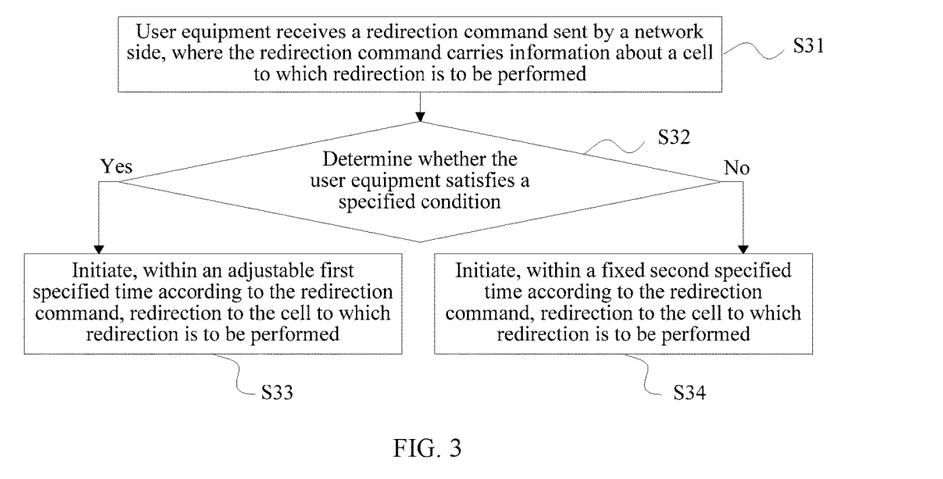
FIG. 3 is a flowchart of another redirection method according to an embodiment of the present invention.

In some cases, even if UE does not send a measurement report of signal quality of a currently accessed cell to a network side, the network side may further learn that the UE needs redirection by means other interaction information between the network side and the UE, and in this case, the network side also sends a redirection command to the UE. Therefore, an embodiment of the present invention further provides a redirection method shown in FIG. 3. FIG. 3 is a flowchart of another redirection method according to this embodiment of the present invention. As shown in FIG. 3, the method includes the following steps:

S31: User equipment receives a redirection command sent by a network side, where the redirection command carries information about a cell to which redirection is to be performed.

S32: Determine whether the user equipment satisfies a specified condition.

S33: If it is determined that the user equipment does not satisfy the specified condition, initiate, within an adjustable first specified time according to the redirection command, redirection to the cell to which redirection is to be performed.

In this embodiment, after the UE receives the redirection command, whether a current state of the UE is suitable for redirection may be detected. If the current state of the UE is not suitable for redirection, a dynamic timer may be started to perform redirection, and the dynamic timer is configured to set the adjustable first specified time. It may be understood that a state suitable for redirection refers to that the UE has a condition of searching for a redirection target network. For example, the condition refers to that the UE can obtain a radio frequency resource to search for a target network, or the target network is not prohibited, so that the user equipment can be successfully redirected to a 3G network, that is, the UE satisfies the specified condition in the embodiment shown in FIG. 2. Therefore, that currently the UE is in a state not suitable for redirection refers to that the UE does not satisfy the specified condition in the embodiment shown in FIG. 2.

In a preferred implementation manner, the specified time of the dynamic timer may be determined according to at least one of coverage of a currently accessed cell of the UE and a moving speed of the user equipment.

Specifically, the specified time of the dynamic timer may be determined by using a piecewise linear function $$f(c) = \begin{cases} T_1 + \Delta_1 & (0 < c \le A) \\ T_1 + \Delta_2 & (A < c \le B) \\ T_1 + \Delta_3 & (c > B) \end{cases}$$

c represents a quantity of times of requesting redirection in a process in which the UE does not satisfy the specified condition, $T_1$ represents an initial specified time of the dynamic timer, and $\Delta_1$, $\Delta_2$, and $\Delta_3$, and parameters A and B may be specifically determined according to the coverage of the currently accessed cell of the user equipment and the moving speed of the user equipment, where apparently, B>A. For example, if the coverage of the currently accessed cell of the UE is relatively large or the moving speed of the UE is relatively slow, signal quality of the currently accessed cell of the UE changes relatively slowly, and correspondingly, the specified time of the dynamic timer is relatively long. If the coverage of the currently accessed cell of the UE is relatively small or the moving speed of the UE is relatively fast, signal quality of the currently accessed cell of the UE changes relatively fast, and correspondingly, the specified time of the dynamic timer is relatively short.

After receiving the redirection command, the UE detects that the UE is in a state not suitable for redirection. If a static timer is started to perform redirection, registration with a network to which the UE is to be redirected may not be completed within a time set by the timer, which may result in that the user equipment stays, for long time, in a state in which no network is available. In contrast, if a dynamic timer is used, the timer may expire rapidly and enter a redirection failure stage, and the UE initiates a search for an accessible cell, so that an objective of rapidly accessing a network is achieved, and a user is effectively prevented from staying, for a long time, in a state in which no network is available.

It should be noted that in this embodiment, rapid expiration of the timer is implemented by using a dynamic timer in which dynamic accumulation is used instead of a static timer of which a relatively short time is set. Because if the rapid expiration of the timer is implemented by setting the static timer that sets a relatively short time, the UE frequently repeats, within a short time, a process of performing redirection, where the redirection fails, and performing a network search and registering with an accessible cell. In this case, power consumption of the UE and signaling load of the network are increased.

Further, in a preferred implementation manner of this embodiment, in a process in which the dynamic timer is started to perform redirection, before the specified time of the dynamic timer is reached, if a state of the UE being not suitable for redirection is released, that is, the UE starts to satisfy the specified condition, the dynamic timer may further be stopped immediately, so that the dynamic timer expires and directly enters a redirection failure stage, and the UE then initiates a search for an accessible cell, thereby achieving an objective of rapidly accessing a network.

In addition, in an optional implementation manner, after the UE receives the redirection command, if it is determined that the current state of the UE is suitable for redirection (the specified condition is satisfied), S34 of initiating, within a fixed second specified time according to the redirection command, redirection to the cell to which redirection is to be performed may be performed in this case. For example, a static timer may be started to perform redirection, and the static timer is configured to set the fixed second specified time.

Further, in an optional implementation manner, the fixed specified time may be set for the static timer by using the setting method of the timer provided in the embodiment shown in FIG. 2.

According to the redirection method provided in this embodiment, after receiving a redirection command, the UE may first determine whether a current state of the UE is suitable for redirection. If the current state of the UE is suitable for redirection, a static timer is started to perform redirection, so that a success rate of redirection is relatively high if redirection is performed in this case, and UE can rapidly access a cell to which redirection is to be performed. If the current state of the UE is not suitable for redirection, a dynamic timer is started to perform redirection, so that the timer expires rapidly and enters a redirection failure stage, and the UE then initiates a search for an accessible cell, thereby achieving an objective of rapidly accessing a network, and at the same time preventing power consumption of the UE and signaling load of the network from increasing.

Figure 4:
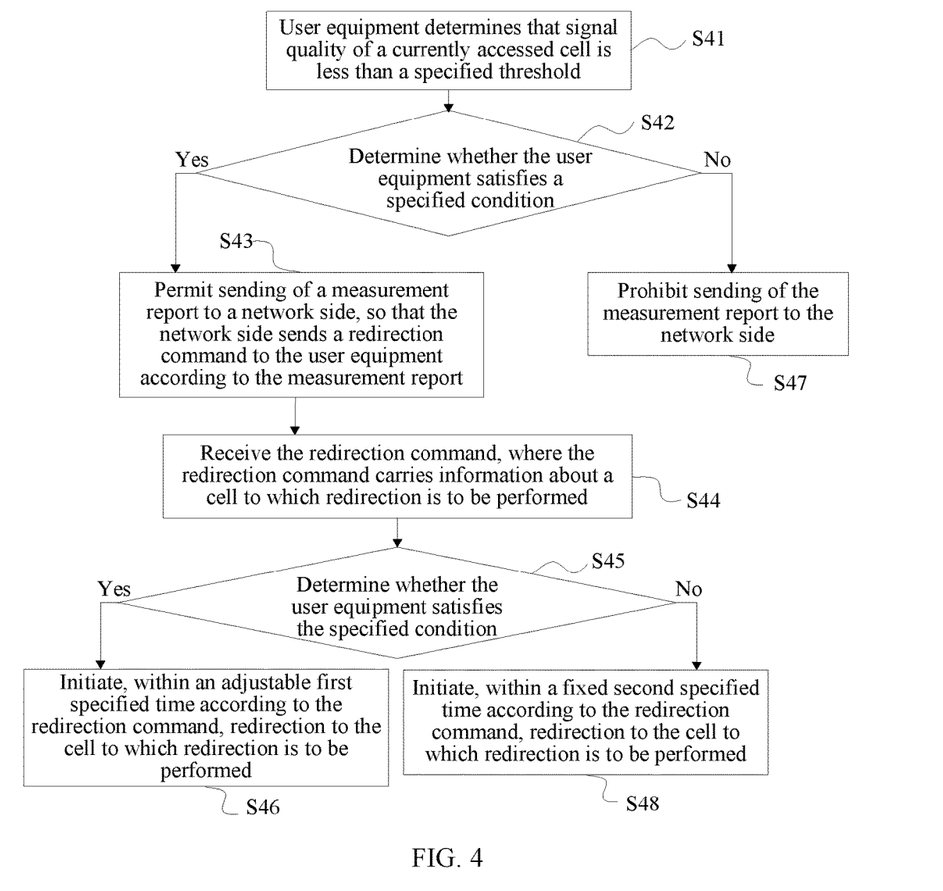
FIG. 4 is a flowchart of still another redirection method according to an embodiment of the present invention.

The present invention further provides a redirection method shown in FIG. 4. FIG. 4 is a flowchart of still another redirection method according to an embodiment of the present invention. As shown in FIG. 4, the redirection method provided in this embodiment includes the following steps:

S41: User equipment determines that signal quality of a currently accessed cell is less than a specified threshold.

S42: Determine whether the user equipment satisfies a specified condition.

S43: If it is found based on the foregoing determining that the user equipment satisfies the specified condition, permit sending of a measurement report to a network side, so that the network side sends a redirection command to the user equipment according to the measurement report.

S44: Receive the redirection command, where the redirection command carries information about a cell to which redirection is to be performed.

S45: Determine a second time whether the user equipment satisfies the specified condition.

S46: If it is found, based on the second time of determining, that the user equipment does not satisfy the specified condition, initiate, within an adjustable first specified time according to the redirection command, redirection to the cell to which redirection is to be performed.

It may be understood that after the UE sends the measurement report to the network side, a service status of the UE may change. Therefore, after receiving the redirection command, the UE may further detect a second time whether the current state of the UE is suitable for redirection, that is, whether the UE satisfies the specified condition. Apparently, the specified condition in this embodiment is the same as the specified condition in the embodiments shown in FIG. 2 and FIG. 3, and the specified condition may be set according to at least one of a network standard or the service status supported by the user equipment.

In a preferred implementation manner, after the UE determines that the signal quality of the currently accessed cell is less than the specified threshold, if it is determined that the user equipment does not satisfy the specified condition, S47 of prohibiting sending of the measurement report to the network side may be performed. The network side is temporarily not triggered to send the redirection command to the UE, so that the UE may continue residing in the currently accessed cell, and a normal service of a user is ensured.

In addition, after receiving the redirection command, the UE detects a second time whether the current state of the UE is suitable for redirection. If it is determined that the user equipment is suitable for redirection (the specified condition is satisfied), S48 of initiating, within a fixed second specified time according to the redirection command, redirection to the cell to which redirection is to be performed may be performed.

In a specific implementation process, reference may be made to starting of the dynamic timer and the static timer to perform redirection provided in the embodiment shown in FIG. 3. Specifically, for the setting of a specified time of the dynamic timer and a specified time of the static timer, reference may also be made to the setting method provided in the embodiment shown in FIG. 3.

It needs to be mentioned that in a process in which the dynamic timer is started to perform redirection, before the specified time of the dynamic timer is reached, if the state of the UE of being not suitable for redirection is released, that is, the UE starts to satisfy the specified condition, the dynamic timer may further be stopped immediately, so that the dynamic timer expires and directly enters a redirection failure stage, and the UE initiates a search for an accessible cell, thereby achieving an objective of rapidly accessing a network.

In the redirection method provided in this embodiment, the embodiments shown in FIG. 2 and FIG. 3 are combined, and an determining operation is performed twice, so that a success rate of redirection is further ensured, a user is effectively prevented from staying, for a long time, in a state in which no network is available, and a normal service of the user is ensured.

Figure 5:
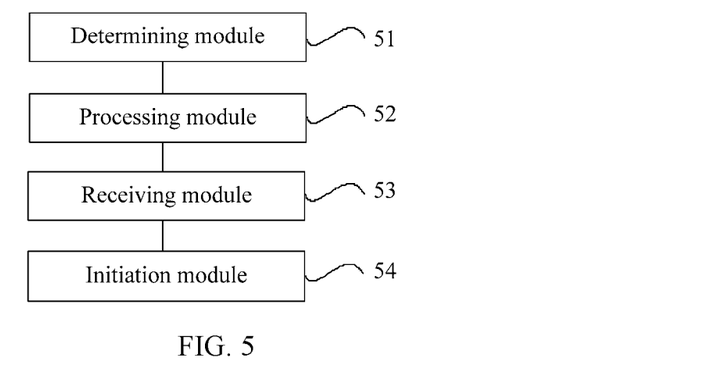
FIG. 5 is a schematic diagram of a redirection apparatus according to an embodiment of the present invention.

FIG. 5 is a schematic diagram of a redirection apparatus according to an embodiment of the present invention. The apparatus may be specifically disposed in UE. As shown in FIG. 5, the redirection apparatus provided in this embodiment includes a determining module 51, a processing module 52, a receiving module 53, and an initiation module 54.

The determining module 51 is configured to determine that signal quality of a currently accessed cell of the user equipment is less than a specified threshold. The processing module 52 is configured to: if it is determined that the user equipment satisfies the specified condition, permit sending of a measurement report to a network side, so that the network side sends a redirection command to the user equipment according to the measurement report. The receiving module 53 is configured to receive the redirection command. The redirection command carries information about a cell to which redirection is to be performed. The initiation module 54 is configured to initiate, within a specified time according to the redirection command, redirection to the cell to which redirection is to be performed.

In an actual application, the processing module 52 may further be configured to: if it is determined that the user equipment does not satisfy the specified condition, prohibit sending of the measurement report to the network side.

In an example of an implementation manner, the specified condition of the user equipment may be set according to at least one of a network standard or a service status supported by the user equipment.

In an optional implementation manner, the specified time may be carried in the redirection command.

The redirection apparatus provided in this embodiment may be configured to perform the steps of the redirection method provided in the embodiment shown in FIG. 2 of the present invention. The redirection apparatus and the steps of the redirection method have similar implementation principles and technical effects, and details are not described herein again.

Figure 6:
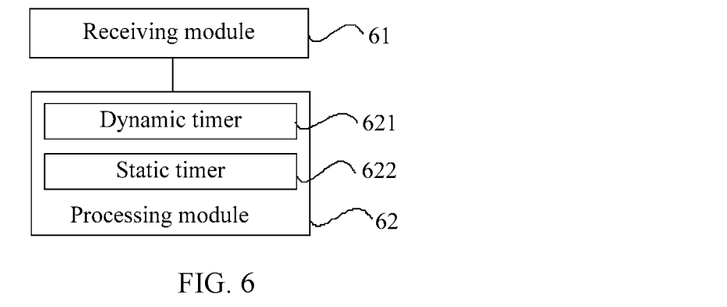
FIG. 6 is a schematic diagram of another redirection apparatus according to an embodiment of the present invention.

FIG. 6 is a schematic diagram of another redirection apparatus according to an embodiment of the present invention. The redirection apparatus may be configured to perform the steps of the redirection method provided in the embodiment shown in FIG. 3 of the present invention. The apparatus may be specifically disposed in UE. As shown in FIG. 6, the redirection apparatus provided in this embodiment includes a receiving module 61 and a processing module 62. The receiving module 61 is configured to receive a redirection command sent by a network side. The redirection command carries information about a cell to which redirection is to be performed. The processing module 62 is configured to: determine whether the user equipment satisfies a specified condition, and if it is determined that the user equipment does not satisfy the specified condition, initiate, within an adjustable first specified time according to the redirection command, redirection to the cell to which redirection is to be performed.

In an example of an implementation manner, the specified condition of the user equipment may be set according to at least one of a network standard or a service status supported by the user equipment.

Further, in an example of an implementation manner, the processing module 62 may specifically include a dynamic timer 621. After the receiving module 61 receives the redirection command sent by the network side, the processing module 62 determines whether the user equipment satisfies the specified condition, that is, determines whether the user equipment is in a state suitable for redirection, and if it is determined that the user equipment is in a state not suitable for redirection (the specified condition is not satisfied), starts the dynamic timer 621 to perform redirection. The dynamic timer 621 is configured to set an adjustable first specified time, and the user equipment initiates, within the adjustable first specified time according to the redirection command, redirection to the cell to which redirection is to be performed.

Further, in a preferred implementation manner, the first specified time of the dynamic timer 621 may be set according to at least one of coverage of a currently accessed cell of the user equipment or a moving speed of the user equipment.

Further, in a specific implementation manner, the first specified time may be determined according to a function $$f(c) = \begin{cases} T_1 + \Delta_1 & (0 < c \leq A) \\ T_1 + \Delta_2 & (A < c \leq B) , \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B may be specifically determined according to the coverage of the currently accessed cell of the user equipment and the moving speed of the user equipment, where apparently, B>A.

Further, in a preferred implementation manner, if the state of the user equipment being not suitable for redirection is released before the first specified time is reached, that is, the user equipment starts to satisfy the specified condition, the processing module 62 is further configured to stop the dynamic timer, so that the dynamic timer expires and ends the first specified time, and the user equipment may search for an accessible cell and connect to a network.

In a preferred implementation manner, the processing module 62 may further include a static timer 622. If it is detected that the user equipment is in a state suitable for redirection, that is, the user equipment satisfies the specified condition, the processing module 62 starts the static timer 622 to perform redirection. The static timer 622 is configured to set a fixed second specified time, and initiate, within the fixed second specified time according to the redirection command, redirection to the cell to which redirection is to be performed.

Further, in a preferred implementation manner, the second specified time may be determined according to the redirection command, that is, the second specified time may be carried in the redirection command.

The redirection apparatus provided in this embodiment may be configured to perform the steps of the redirection method provided in the embodiment shown in FIG. 3 of the present invention. The redirection apparatus and the steps of the redirection method have similar implementation principles and technical effects, and details are not described herein again.

Figure 7:
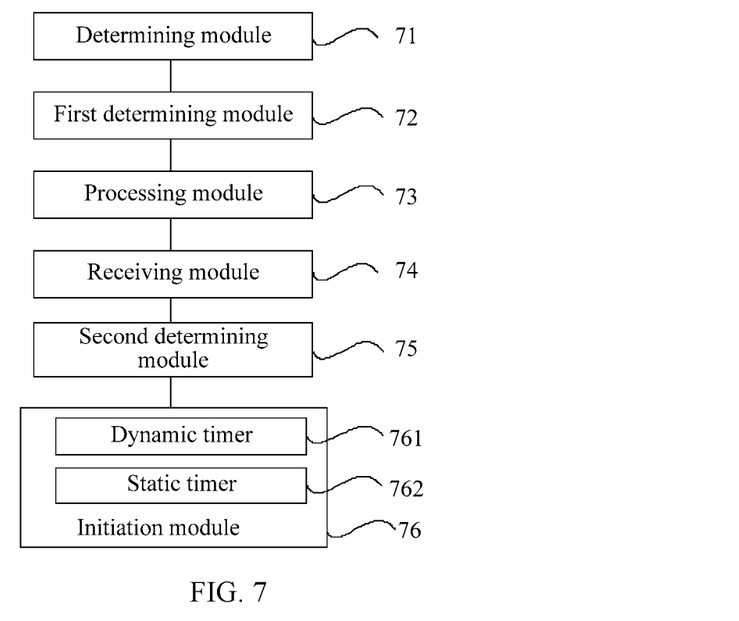
FIG. 7 is a schematic diagram of still another redirection apparatus according to an embodiment of the present invention.

FIG. 7 is a schematic diagram of still another redirection apparatus according to an embodiment of the present invention. The redirection apparatus may be configured to perform the steps of the redirection methods provided in the embodiments shown in FIG. 2 to FIG. 4 of the present invention. The apparatus may be specifically disposed in UE. As shown in FIG. 7, the redirection apparatus provided in this embodiment includes a determining module 71, a first determining module 72, a processing module 73, a receiving module 74, a second determining module 75, and an initiation module 76. The determining module 71 is configured to determine that signal quality of a currently accessed cell of the user equipment is less than a specified threshold. The first determining module 72 is configured to determine whether the user equipment satisfies a specified condition. The processing module 73 is configured to: if the first determining module determines that the user equipment satisfies the specified condition, permit sending of a measurement report to a network side, so that the network side sends a redirection command to the user equipment according to the measurement report. The receiving module 74 is configured to receive the redirection command. The redirection command carries information about a cell to which redirection is to be performed. The second determining module 75 is configured to: after the redirection command is received, determine a second time whether the user equipment satisfies the specified condition. The initiation module 76 is configured to: if the second determining module determines that the user equipment does not satisfy the specified condition, initiate, within an adjustable first specified time according to the redirection command, redirection to the cell to which redirection is to be performed.

In a preferred implementation manner, the processing module 73 is further configured to: if the first determining module determines that the user equipment does not satisfy the specified condition, prohibit sending of the measurement report to the network side.

In an actual application, the specified condition may be set according to at least one of a network standard or a service status supported by the user equipment.

Further, in an example of an implementation manner, the initiation module 76 may specifically include a dynamic timer 761. After the receiving module 74 receives the redirection command sent by the network side, whether the user equipment satisfies the specified condition is determined a second time, that is, whether the user equipment is in a state suitable for redirection is determined. If it is determined that the user equipment is in a state not suitable for redirection, the dynamic timer 761 is started to perform redirection. The dynamic timer 761 is configured to set an adjustable first specified time.

Further, in a preferred implementation manner, the first specified time of the dynamic timer 761 may be set according to at least one of coverage of a currently accessed cell of the user equipment or a moving speed of the user equipment.

Further, in a specific implementation manner, the first specified time may be determined according to a function $$f(c) = \begin{cases} T_1 + \Delta_1 & (0 < c \leq A) \\ T_1 + \Delta_2 & (A < c \leq B) \\ T_1 + \Delta_3 & (c > B) \end{cases},$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B may be specifically determined according to the coverage of the currently accessed cell of the user equipment and the moving speed of the user equipment, where apparently, B>A.

Further, in a preferred implementation manner, if the state of the user equipment being not suitable for redirection is released before the first specified time is reached, that is, the user equipment starts to satisfy the specified condition, the initiation module 76 is further configured to stop the dynamic timer, so that the dynamic timer expires and ends the first specified time, and the user equipment may search for an accessible cell and connect to a network.

In a preferred implementation manner, the initiation module 76 may further include a static timer 762, and if it is detected that the user equipment is in the state suitable for redirection, that is, the user equipment satisfies the specified condition, the static timer 762 is started to perform redirection. The static timer 762 is configured to set a fixed second specified time.

Further, in a preferred implementation manner, the second specified time may be determined according to the redirection command. It may be understood that the redirection command delivered by the network side may further carry a redirection time value, that is, a value of a second specified time.

The redirection apparatus provided in this embodiment may be configured to perform the steps of the redirection methods provided in the embodiments shown in FIG. 2 to FIG. 4 of the present invention. The redirection apparatus and the steps of the redirection methods have similar implementation principles and technical effects, and details are not described herein again.

Figure 8:
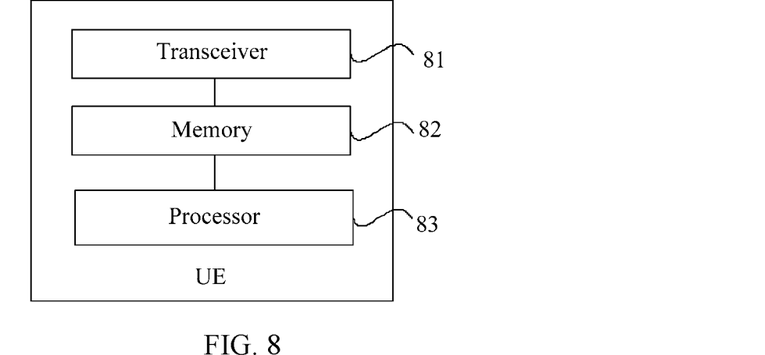
FIG. 8 is a schematic diagram of user equipment according to an embodiment of the present invention.

FIG. 8 is a schematic diagram of user equipment according to an embodiment of the present invention. The user equipment provided in this embodiment may be configured to implement the redirection method provided in the embodiment shown in FIG. 2 of the present invention. As shown in FIG. 7, the user equipment includes a transceiver 81, a memory 82, and a processor 83. The processor 83 is coupled to the memory 82.

Specifically, the processor 83 may be configured to: determine that signal quality of a currently accessed cell is less than a specified threshold; if it is determined that the user equipment satisfies the specified condition, permit sending of a measurement report to a network side, so that the network side sends a redirection command to the user equipment according to the measurement report; and after the transceiver receives the redirection command, initiate, within a specified time according to the redirection command, redirection to a cell to which redirection is to be performed. The redirection command carries information about the cell to which redirection is to be performed.

In an actual application, the processor 83 may further be configured to: if it is determined that the user equipment does not satisfy the specified condition, prohibit sending of the measurement report to the network side.

For example, the specified condition of the user equipment may be set according to at least one of a network standard or a service status supported by the user equipment.

For example, the fixed specified time may be carried in the redirection command.

The user equipment provided in this embodiment may be configured to implement the redirection method provided in the embodiment shown in FIG. 2 of the present invention. The user equipment and the redirection method have similar implementation principles and technical effects, and details are not described herein again.

Figure 9:
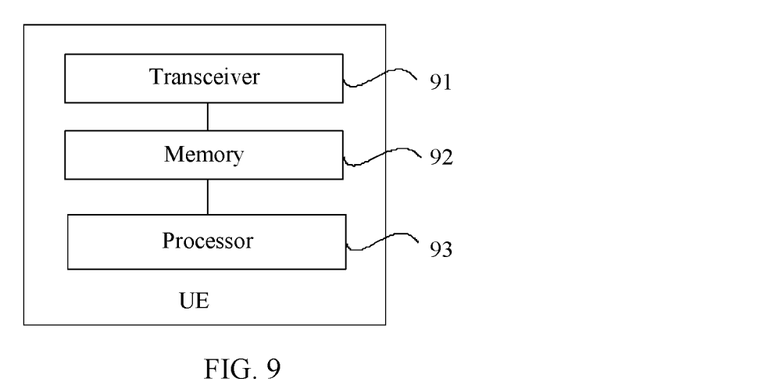
FIG. 9 is a schematic diagram of another user equipment according to an embodiment of the present invention.

FIG. 9 is a schematic diagram of another user equipment according to an embodiment of the present invention. The user equipment provided in this embodiment may be configured to implement the redirection method provided in the embodiment shown in FIG. 3 of the present invention. As shown in FIG. 9, the user equipment includes a transceiver 91, a memory 92, and a processor 93. The processor 93 is coupled to the memory 92.

Specifically, the processor 93 may be configured to: after the transceiver 91 receives a redirection command sent by a network side, if it is determined that the user equipment does not satisfy a specified condition, initiate, within an adjustable first specified time according to the redirection command, redirection to a cell to which redirection is to be performed. The redirection command carries information about the cell to which redirection is to be performed.

For example, the specified condition of the user equipment may be set according to at least one of a network standard or a service status supported by the user equipment. The first specified time may be determined according to at least one of coverage of a currently accessed cell of the user equipment or a moving speed of the user equipment.

Specifically, the first specified time may be determined according to a function $$f(c) = \begin{cases} T_1 + \Delta_1 & (0 < c \le A) \\ T_1 + \Delta_2 & (A < c \le B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

In addition, if the user equipment starts to satisfy the specified condition before the first specified time is reached, the processor 93 may further be configured to end the first specified time, so that the user equipment searches for an accessible cell.

In an actual application, the processor 93 may further be configured to: after the transceiver receives the redirection command sent by the network side, if it is determined that the user equipment satisfies the specified condition, initiate, within a fixed second specified time according to the redirection command, redirection to the cell to which redirection is to be performed. For example, the second specified time may be carried in the redirection command.

The user equipment provided in this embodiment may be configured to implement the redirection method provided in the embodiment shown in FIG. 3 of the present invention. The user equipment and the redirection method have similar implementation principles and technical effects, and details are not described herein again.

Figure 10:
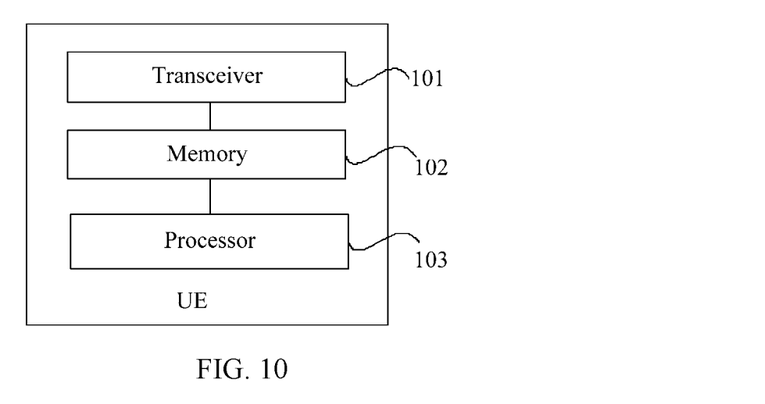
FIG. 10 is a schematic diagram of still another user equipment according to an embodiment of the present invention.

FIG. 10 is a schematic diagram of still another user equipment according to an embodiment of the present invention. The user equipment provided in this embodiment may be configured to implement the redirection methods provided in the embodiments shown in FIG. 2 to FIG. 4 of the present invention. As shown in FIG. 10, the user equipment includes a transceiver 101, a memory 102, and a processor 103. The processor 103 is coupled to the memory 102.

Specifically, the processor 103 may be configured to: determine that signal quality of a currently accessed cell is less than a specified threshold; determine whether the user equipment satisfies a specified condition; if it is found, based on the determining, that the user equipment satisfies the specified condition, permit sending of a measurement report to a network side, so that the network side sends a redirection command to the user equipment according to the measurement report; after the transceiver receives the redirection command, determine a second time whether the user equipment satisfies the specified condition; and if it is found, based on the second time of determining, that the user equipment does not satisfy the specified condition, initiate, within an adjustable first specified time according to the redirection command, redirection to a cell to which redirection is to be performed.

In an actual application, the processor 103 may further be configured to: if it is found, based on the first time of determining, that the user equipment does not satisfy the specified condition, prohibit sending of the measurement report to the network side.

For example, the specified condition of the user equipment may be set according to at least one of a network standard or a service status supported by the user equipment. The first specified time may be determined according to at least one of coverage of a currently accessed cell of the user equipment or a moving speed of the user equipment.

Specifically, the first specified time may be determined according to a function $$f(c) = \begin{cases} T_1 + \Delta_1 & (0 < c \le A) \\ T_1 + \Delta_2 & (A < c \le B), \\ T_1 + \Delta_3 & (c > B) \end{cases}$$

where c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, where B>A.

In an actual application, if the user equipment starts to satisfy the specified condition before the first specified time is reached, the processor 103 may further be configured to end the first specified time, so that the user equipment searches for an accessible cell.

In an actual application, the processor 103 is further configured to: if it is found, based on the second time of determining, that the user equipment satisfies the specified condition, initiate, within a fixed second specified time according to the redirection command, redirection to the cell to which redirection is to be performed. For example, the second specified time may be carried in the redirection command.

The user equipment provided in this embodiment may be configured to implement the redirection methods provided in the embodiments shown in FIG. 2 to FIG. 4 of the present invention. The user equipment and the redirection methods have similar implementation principles and technical effects, and details are not described herein again.

An embodiment of the present invention further provides various redirection systems, including an eNB and user equipment that has the redirection apparatus provided in the embodiment shown in FIG. 5, FIG. 6, or FIG. 7, or including an eNB and user equipment provided in the embodiment shown in FIG. 8, FIG. 9, or FIG. 10.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A redirection method, comprising:

determining, by a user equipment, that signal quality of a currently accessed cell is less than a specified threshold;

in response to determining that the signal quality is less than a specified threshold, determining, by the user equipment, whether the user equipment is in a state that is suitable for redirection based on whether the user equipment satisfies a specified condition that is set according to at least one of a network standard or a service status supported by the user equipment;

if the user equipment determines that the user equipment is in the state that is suitable for redirection based on the user equipment satisfying the specified condition, sending, by the user equipment, a measurement report to a network side;

receiving, by the user equipment, a redirection command sent by the network side in response to the measurement report, wherein the redirection command carries information about a cell to which a redirection is to be performed; and initiating, by the user equipment, within a specified time according to the redirection command, the redirection to the cell.

2. The method according to claim 1, wherein the method further comprises:

if the user equipment does not satisfy the specified condition, refraining from sending the measurement report to the network side.

3. The method according to claim 1, wherein the specified time is carried in the redirection command.

4. A redirection method, comprising:

receiving, by a user equipment, a redirection command sent by a network side, wherein the redirection command carries information about a cell to which a redirection is to be performed;

in response to receiving the redirection command, determining, by the user equipment, whether the user equipment is in a state that is suitable for redirection based on whether the user equipment satisfies a specified condition that is set according to at least one of a network standard or a service status supported by the user equipment;

if the user equipment determines that the user equipment is not in the state that is suitable for redirection based on the user equipment not satisfying the specified condition, determining, by the user equipment, an adjustable first specified time; and initiating by the user equipment and according to the redirection command, within the adjustable first specified time, the redirection to the cell.

5. The method according to claim 4, wherein the adjustable first specified time is determined according to at least one of a coverage of a currently accessed cell of the user equipment or a moving speed of the user equipment.

6. The method according to claim 5, wherein that the adjustable first specified time is determined according to a function:

$$f(c) = \begin{cases} T_1 + \Delta_1 & (0 < c \leq A) \\ T_1 + \Delta_2 & (A < c \leq B), \\ T_1 + \Delta_3 & (c > B) \end{cases}$$

wherein c represents a quantity of times of requesting redirection in a process in which the user equipment does not satisfy the specified condition, $T_1$ represents an initial specified time, and $\Delta_1$, $\Delta^2$ and $\Delta_3$, and parameters A and B are determined according to the coverage of the currently accessed cell of the user equipment and the moving speed of the user equipment, wherein B>A.

7. The method according to claim 4, wherein after the initiating, the method further comprises:

if the user equipment satisfies the specified condition before the adjustable first specified time is reached:
ending the adjustable first specified time; and
searching for an accessible cell.

8. The method according to claim 4, wherein the method further comprises:

if the user equipment satisfies the specified condition, initiating by the user equipment, within a fixed second specified time according to the redirection command, the redirection to the cell to which redirection is to be performed.

9. The method according to claim 8, wherein the fixed second specified time is carried in the redirection command.

10. A redirection method, comprising:

determining, by a user equipment, that signal quality of a currently accessed cell is less than a specified threshold;

in response to determining that the signal quality is less than a specified threshold, determining, by the user equipment, whether the user equipment is in a state that is suitable for redirection based on whether the user equipment satisfies a specified condition that is set according to at least one of a network standard or a service status supported by the user equipment;

if the user equipment determines that the user equipment is in the state that is suitable for redirection based on the user equipment satisfying the specified condition, sending a measurement report to a network side;

receiving, by the user equipment, a redirection command sent by the network side according to the measurement report, wherein the redirection command carries information about a cell to which a redirection is to be performed;

in response to receiving the redirection command, determining, by the user equipment, whether the user equipment is in the state that is suitable for redirection based on whether the user equipment satisfies the specified condition after receiving the redirection command;

if the user equipment determines that the user equipment is not in the state that is suitable for redirection based on the user equipment not satisfying the specified condition after receiving the redirection command, determining, by the user equipment, an adjustable first specified time; and initiating by the user equipment according to the redirection command, within the adjustable first specified time, the redirection to the cell.

11. The method according to claim 10, wherein the method further comprises:
if the user equipment is determined to not satisfy the specified condition prior to sending the measurement report, refraining from sending of the measurement report to the network side.

12. The method according to claim 10, wherein the adjustable first specified time is determined according to at least one of a coverage of a currently accessed cell of the user equipment or a moving speed of the user equipment.

13. The method according to claim 12, wherein that the adjustable first specified time is determined according to a function:

$$f(c) = \begin{cases} T_1 + \Delta_1 & (0 < c \leq A) \\ T_1 + \Delta_2 & (A < c \leq B), \\ T_1 + \Delta_3 & (c > B) \end{cases}$$

wherein c represents a quantity of times of requesting redirection in a process in which the user equipment does not satisfy the specified condition, $T_1$ represents an initial specified time, and $\Delta_1$, $\Delta_2$, and $\Delta_3$, and parameters A and B are determined according to the coverage of the currently accessed cell of the user equipment and the moving speed of the user equipment, wherein B>A.

14. The method according to claim 10, wherein after the initiating, the method further comprises:
if the user equipment satisfies the specified condition before the adjustable first specified time is reached:
ending the adjustable first specified time; and
searching for an accessible cell.

15. The method according to claim 10, wherein the method further comprises:
if the user equipment is determined to satisfy the specified condition after receiving the redirection command, initiating by the user equipment, within a fixed second specified time according to the redirection command, the redirection to the cell to which redirection is to be performed.

16. The method according to claim 15, wherein the fixed second specified time is carried in the redirection command.

* * * * *

UNITED STATES PATENT AND TRADEMARK OFFICE
CERTIFICATE OF CORRECTION

PATENT NO. : 10,524,186 B2
APPLICATION NO. : 15/575317
DATED : December 31, 2019
INVENTOR(S) : Haoping Guo et al.

Page 1 of 1

It is certified that error appears in the above-identified patent and that said Letters Patent is hereby corrected as shown below:

In the Claims

In Column 22, In Line 43, In Claim 6, delete "$\Delta^2$" and insert -- $\Delta_2$ --, therefor.

Signed and Sealed this
Ninth Day of February, 2021

Drew Hirshfeld
*Performing the Functions and Duties of the
Under Secretary of Commerce for Intellectual Property and
Director of the United States Patent and Trademark Office*